US008589734B2

(12) United States Patent
Adir et al.

(10) Patent No.: US 8,589,734 B2
(45) Date of Patent: Nov. 19, 2013

(54) VERIFYING CORRECTNESS OF PROCESSOR TRANSACTIONS

(75) Inventors: Allon Adir, Kiryat Tivon (IL); John Martin Ludden, Essex Junction, VT (US); Avi Ziv, Haifa (IL)

(73) Assignee: International Business Machines Corporation, Armonk, NY (US)

(*) Notice: Subject to any disclaimer, the term of this patent is extended or adjusted under 35 U.S.C. 154(b) by 482 days.

(21) Appl. No.: 12/843,068

(22) Filed: Aug. 26, 2010

(65) Prior Publication Data
US 2012/0054560 A1 Mar. 1, 2012

(51) Int. Cl.
*G06F 11/00* (2006.01)

(52) U.S. Cl.
USPC .......................................... 714/33; 712/220

(58) Field of Classification Search
USPC .............. 714/25, 33, 38.1, 42, 54, 32, 37, 39; 717/132, 135; 703/22; 707/687, 703; 712/220
See application file for complete search history.

(56) References Cited

U.S. PATENT DOCUMENTS

| | | | |
|---|---|---|---|
| 6,587,969 B1 | 7/2003 | Weinberg et al. | |
| 6,810,494 B2 | 10/2004 | Weinberg et al. | |
| 6,892,286 B2 | 5/2005 | Hangal et al. | |
| 7,089,253 B2* | 8/2006 | Hinshaw et al. | 707/703 |
| 7,779,393 B1* | 8/2010 | Manovit et al. | 717/132 |
| 2003/0130831 A1 | 7/2003 | Adir | |
| 2004/0093536 A1* | 5/2004 | Weller | 714/33 |
| 2008/0288834 A1* | 11/2008 | Manovit et al. | 714/718 |

OTHER PUBLICATIONS

Allon Adir and Gil Shurek "Generating concurrent test-programs with collisions for multi-processor verification", Seventh IEEE International High-Level Design Validation and Test Workshop (HLDVT), pp. 77-82, 2002.
Saha, A.; Malik, N.; O'Krafka, B.; Lin, J.; Raghavan, R.; Shamsi, U "A simulation-based approach to architectural verification of multi-processor systems", Proceedings of the IEEE Fourteenth Annual International Phoenix Conference on Computers and Communications Conference, pp. 34-37, 1995.
Chaiyasit Manovit, Sudheendra Hangal, Hassan Chafi, Austen McDonald, Christos Kozyrakis, Kunle Olukotun: "Testing implementations of transactional memory". 15th International Conference on Parallel Architecture and Compilation Techniques, pp. 134-143, 2006.
Kaiyu Chen et al., "Runtime Validation of Transactional Memory Systems", 2008 9th International Symposium on Quality Electronic Design (ISQED '08), pp. 750-756. Publisher: IEEE.

* cited by examiner

*Primary Examiner* — Scott Baderman
*Assistant Examiner* — Joseph Kudirka

(57) ABSTRACT

An operation of a processor in respect to transactions is checked by simulating an execution of a test program, and updating a transaction order graph to identify a cycle. The graph is updated based on a value read during an execution of a first transaction and a second transaction that is the configured to set the memory with the read value. The test program comprises information useful for identifying the second transaction.

27 Claims, 5 Drawing Sheets

```
505
THREAD 0              THREAD 1
tbegin *X1            tbegin *X3
Write 0x5000, 11      Read 0x5000, G1
    D 0x5000, 11         R G1, 00, *IN
tend                     R G1, 11, *X1
                         R G1, 22, *X2
tbegin *X2            Read 0x6000, G2
Write 0x5000, 22         R G2, 00, *IN
    D 0x5000, 22         R G2, 22, *X2
Write 0x6000, 22      tend
    D 0x6000, 22
tend
```

```
THREAD 0              THREAD 1              THREAD 2
tbegin *X1            tbegin *X2            tbegin *X3
Write 0x5000, 11      Write 0x6000, 22      Read 0x5000, G1
Write 0x6000, 11      Write 0x7000, 22        R 00, *IN
tend                  tend                    R 11, *X1
                                            Read 0x6000, G2
                                              R 00, *IN
                                              R 11, *X1
                                              R 22, *X2
                                            Read 0x7000, G3
                                              R 00, *IN
                                              R 22, *X2
                                            tend
```

FIG. 4

```
THREAD 0              THREAD 1
tbegin *X1            tbegin *X3
Write 0x5000, 11      Read 0x5000, G1
      D 0x5000, 11          R G1, 00, *IN
tend                        R G1, 11, *X1
                            R G1, 22, *X2
tbegin *X2            Read 0x6000, G2
Write 0x5000, 22            R G2, 00, *IN
      D 0x5000, 22          R G2, 22, *X2
Write 0x6000, 22      tend
      D 0x6000, 22
tend
```

FIG. 5

VERIFYING CORRECTNESS OF PROCESSOR TRANSACTIONS

BACKGROUND

The present disclosure relates to processor verification in general, and to checking of a simulated execution of a processor for correct execution of transactions, in particular.

Computerized devices control almost every aspect of our life from writing documents to controlling traffic lights. However, computerized devices are bug-prone, and thus require a testing phase in which the bugs should be discovered. The testing phase is considered one of the most difficult tasks in designing a computerized device.

The cost of a bug may be enormous, as its consequences may be disastrous. For example, a bug may cause the injury of a person relying on the designated behavior of the computerized device. Additionally, a bug in hardware or firmware may be expensive to fix, as patching it requires call-back of the computerized device. Hence, many developers of computerized devices invest a substantial portion, such as 70%, of the development cycle to discover erroneous behaviors of the computerized device.

Correctness of a functionality of a processor, or similar electronic circuit or computing device, may be verified. The verification process may be performed based upon a description of the processor, such as provided using a descriptive language such as for example VHDL, Verilog, SystemC or the like. In order to verify the processor, a test program may be generated by a test generator and a simulator, configured to simulate an execution of the processor, also referred to as the target processor, based on the functionality described using the descriptive language, in respect to the test program. Correctness of the simulated execution may be checked in order to detect bugs in the processor. In some cases, several test programs may be generated. Each test program may be executed more than once.

Some processor design includes support for transactional memory model. A transaction is a construct in the machine language that can be used by parallel applications when a number of processes access a shared resource. Instructions of a transaction appear to be performed atomically. The instructions, performed by a processing entity of the processor, such as a hardware thread, a core or the like, are performed without any observable collisions with any memory access performed by other processing entities.

Some processors further require a serializability property of the transactions. The serializability property requires that an order between transactions be the same for all processing entities of the processor. In some exemplary embodiments, in case a first order between transactions, as observed by a first processing entity of the processor, is different than a second order between transactions, as observed by a second processing entity of the processor, the processor may be considered as not holding the serializability property.

BRIEF SUMMARY

One exemplary embodiment of the disclosed subject matter is a computer-implemented method for checking a processor, the method comprising: obtaining a test program of the processor, the test program comprising a plurality of transactions, the plurality of transactions comprising instructions for the processor, wherein at least one of the instructions is a read instruction, the read instruction is associated with alternative values and identifications of transactions of the plurality of transactions that are operable to set each of the alternative values to be read by the read instruction; simulating an execution by the processor of the test program, wherein the simulating is performed by a computer having the storage device; determining a value read by the read instruction during the simulating; updating a transaction order graph retained in a storage device based upon at least: a first transaction executing the read instruction; and a second transaction associated in the test program with setting the value read by the read instruction; in response to identification of a cycle in the transaction order graph, providing an error indication; and whereby a state of the storage device is modified during the simulating.

Another exemplary embodiment of the disclosed subject matter is a computerized apparatus for checking a processor, the computerized apparatus having a second processor and a storage device; the computerized apparatus comprising: a test program obtainer configured to obtain a test program of the processor, the test program comprising a plurality of transactions, the plurality of transactions comprising instructions for the processor, wherein at least one of the instructions is a read instruction, the read instruction is associated with alternative values and identifications of transactions of the plurality of transactions that are operable to set each of the alternative values to be read by the read instruction; and a simulator configured to simulate an execution by the processor of the test program, wherein the simulator is operable to modify values of memory locations in the storage device, wherein the simulator comprising: a read instruction operator configured to perform a read instruction of a first transaction of the test program; a value source determinator configured to determine a second transaction associated in the test program with setting a value read by the read instruction operator; a transaction order graph module configured to update a transaction order graph retained in the storage device; wherein the simulator is operative to utilize the transaction order graph module to add a representation that the second transaction is executed during the execution before the first transaction is executed; a cycle identification module configured to identify a cycle in the transaction order graph; and an error indication module configured to provide an error indication in response to an identification of the cycle by the cycle identification module.

Yet another exemplary embodiment of the disclosed subject matter is a computerized apparatus for checking a processor, the computerized apparatus having a second processor and a storage device; the computerized apparatus comprising: a trace obtainer configured to obtain a trace of an execution of a test program of the processor, the test program comprising a plurality of transactions, the plurality of transactions comprising instructions for the processor, wherein at least one of the instructions is a read instruction, the read instruction is associated with alternative values and identifications of transactions of the plurality of transactions that are operable to set each of the alternative values to be read by the read instruction; a trace analyzer configured to analyze the trace, wherein the trace analyzer comprising: a read instruction analyzer configured to identify performing a read instruction of a first transaction of the test program based on the trace; a value source determinator configured to determine a second transaction associated in the test program with setting a value read by the read instruction; a transaction order graph module configured to update a transaction order graph retained in the storage device; wherein the trace analyzer is operative to utilize the transaction order graph module to add a representation that the second transaction is executed during the execution before the first transaction is executed; a cycle identification module configured to identify a cycle in the transaction order graph; and an error indication module configured to provide an error indication in response to an identification of the cycle by the cycle identification module.

Yet another exemplary embodiment of the disclosed subject matter is a computer program product for checking a processor, the computer program product comprising: a non-transitory computer readable medium; a first program instruction for obtaining a test program of the processor, the test program comprising a plurality of transactions, the plurality of transactions comprising instructions for the processor, wherein at least one of the instructions is a read instruction, the read instruction is associated with alternative values and identifications of transactions of the plurality of transactions that are operable to set each of the alternative values to be read by the read instruction; a second program instruction for simulating an execution by the processor of the test program; a third program instruction for determining a value read by the read instruction during the simulation; a fourth program instruction for updating a transaction order graph based upon at least: a first transaction executing the read instruction; and a second transaction associated in the test program with setting the value read by the read instruction; a fifth program instruction for providing an error indication in response to identification of a cycle in the transaction order graph; and wherein the first, second, third, fourth, and fifth program instructions are stored on the non-transitory computer readable medium.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to provide for a method, apparatus and product to check correctness of hardware support for transactions in a simulated execution. Another technical problem is to detect bugs caused by lack of atomicity or serializability in a transaction implementation in a target processor.

One technical solution is to utilize a test program that provides for annotation as to which transaction (referred to as an origin transaction) is associated with setting a value to a memory location out of alternative values. Based on the value that is observed during the execution of the transaction, a relation between the executed transaction and the origin transaction may be determined. Another technical solution is to maintain a Transaction Order Graph (TOG) representing an order of execution during a simulated execution between pairs of transactions, and verifying that the TOG does not comprise any cycles. Yet another technical solution is to generate the test program to include annotation of an origin transaction associated with each alternative value that a read instruction may observe. Yet another technical solution is to update the TOG based on additional rules, such as based on commit order of transactions, final value after the simulated execution ends, order of execution by the same processing entity, alternative origin transactions that could set the value to a different value than that observed, and the like.

One technical effect of utilizing the disclosed subject matter is to provide and utilize information in the test program regarding potential origin transactions to determine actual origin transaction. Another technical effect is to utilize multiple memory accesses in a single transaction to enrich the known ordering of transaction. In some exemplary embodiments, an order between two transactions is determined only once the order is certain. Therefore, another technical effect is to reduce the complexity of finding a cycle in the TOG from an exponential problem to a polynomial problem. Yet another technical effect is to enable checking of transactions when the transactions access a large number of memory locations, as the size of TOG is indifferent of the number of memory locations and is affected by the number of transactions.

Figure 1:
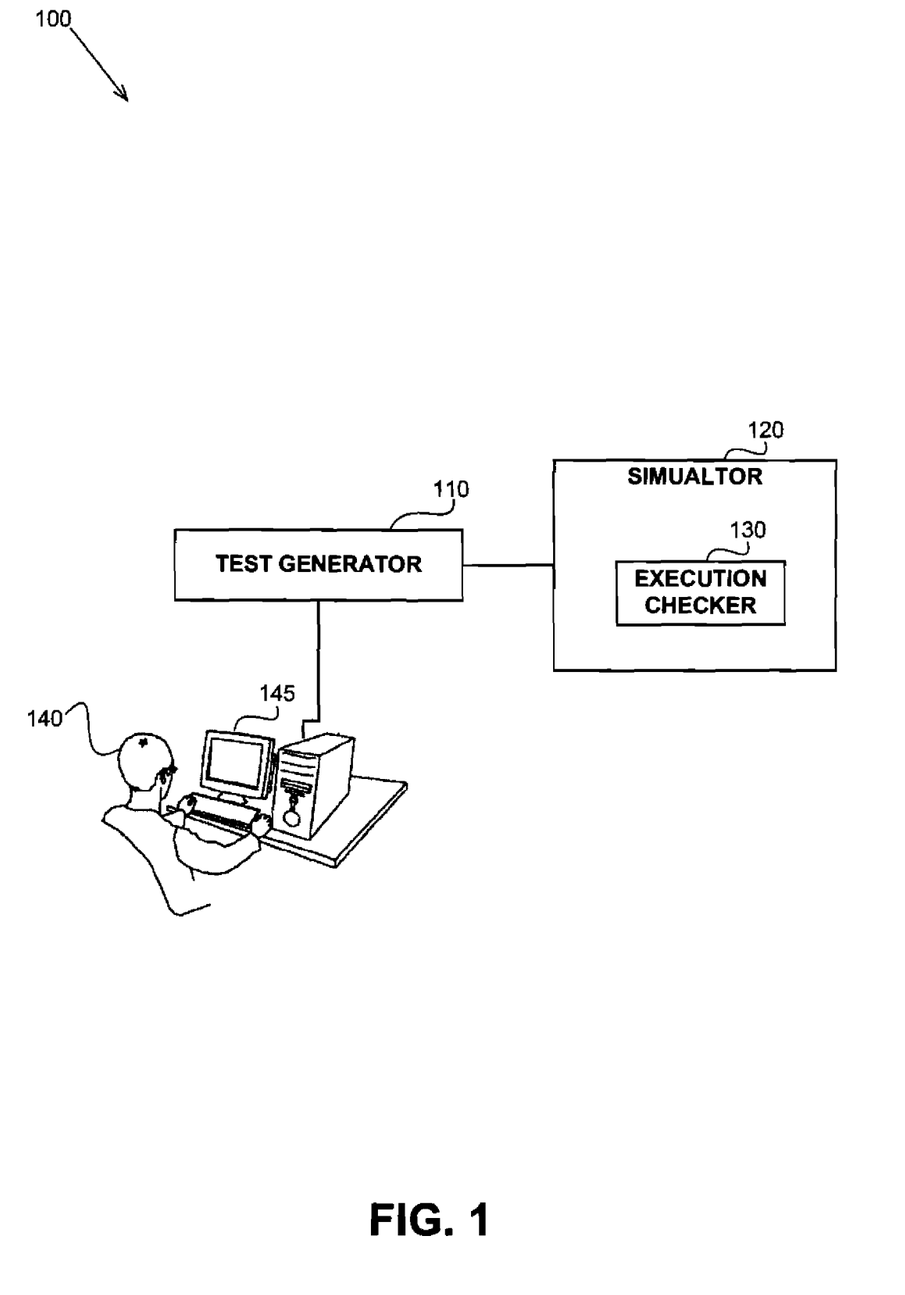
FIG. 1 shows a computerized environment in which the disclosed subject matter is used, in accordance with some exemplary embodiments of the subject matter.

Referring now to FIG. 1 showing a computerized environment in which the disclosed subject matter is used, in accordance with some exemplary embodiments of the subject matter. A computerized environment 100 may comprise a test generator 110 and a simulator 120.

The test generator 110 may be configured to generate a test program, such as based on a test template. The test generator 110 may utilize a Constraint Satisfaction Problem solver (not shown) to generate the test program such that the test program provides predetermined characteristics defined in the test template. The test program may be a program executable by the target processor, such as defined using a pertinent assembly language, binary language, other programming language, or the like.

In some exemplary embodiments, the test program may comprise instructions to one or more processing entities of the target processor. The test program may comprise instructions such as write instruction, read instruction, or the like. In some exemplary embodiments, a portion of the instructions may be comprised by transactions, while another portion may not be comprised by any transaction.

The simulator 120 may be configured to receive or otherwise obtain the test program generated by the test generator 110 and to simulate an execution of the test program by the target processor. The simulator 120 may be configured to provide a substantially same functionality of the target processor. In some exemplary embodiments, the simulator 120 may comprise an execution checker 130 operative to verify correctness of a simulated execution. The execution checker 130 may determine whether transactions initiated during the simulated execution obey the atomicity and/or serializability properties.

In some exemplary embodiments, a user 140, such as a QA staff member, a verification engineer, a developer or the like, may utilize a terminal 145 or similar Man-Machine Interface (MMI) to provide the test program to the simulator 120, to provide the test template to the test generator 110, to provide other configuration preferences to either the test generator 110 or the simulator 120, to view to test program generated by the test generator 110, to view a log of the simulated execution of the simulator 120, to view error indications provided by the execution checker 130 or the like.

Figure 2:
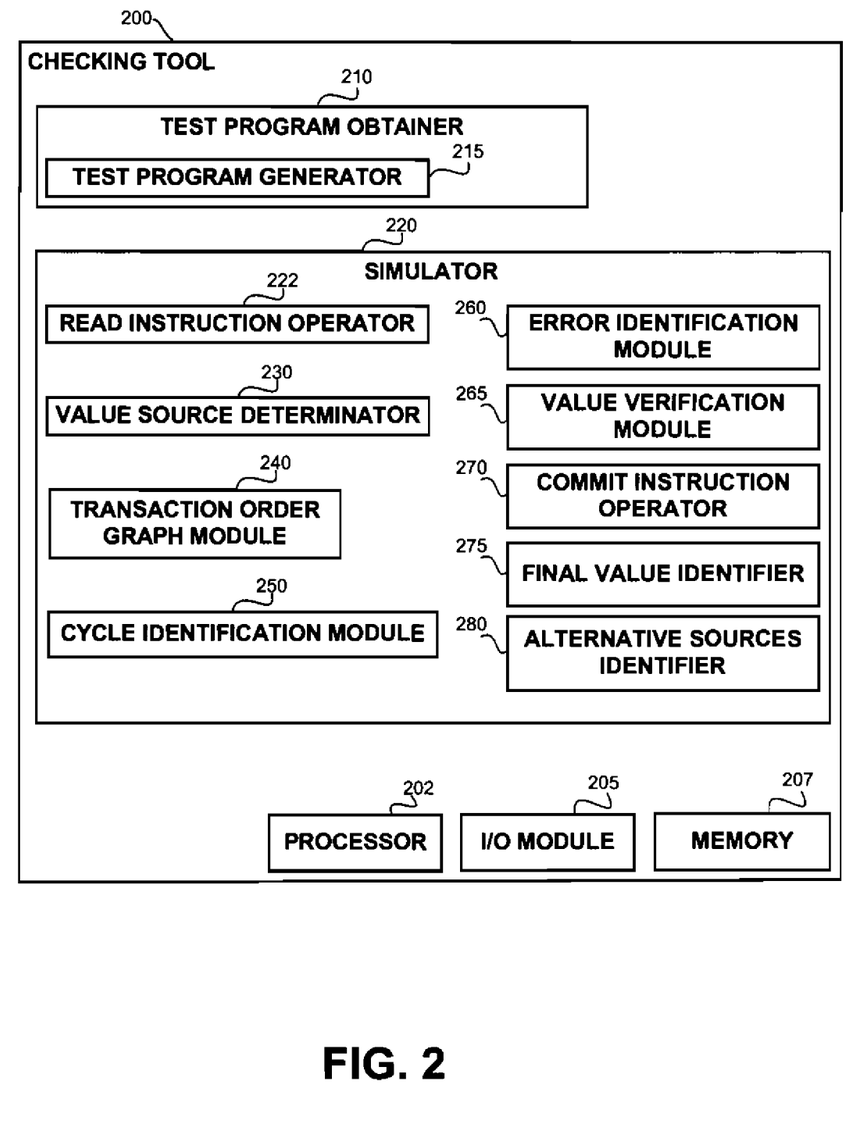
FIG. 2 shows a block diagram of a checking tool, in accordance with some exemplary embodiments of the disclosed subject matter.

Referring now to FIG. 2 showing a block diagram of a checking tool, in accordance with some exemplary embodiments of the disclosed subject matter. A checking tool 200, such as the computerized system 100 of FIG. 1, may be configured to perform a verification activity in respect to the target processor. The checking tool 200 may be operative to check a functionality of the target processor at least in respect to operating transactions.

A test program obtainer 210 may be configured to obtain a test program. In some exemplary embodiments, the test program comprises a set of transactions, each transaction can be uniquely identified. A transaction may be associated with being executed by a processing entity of the target processor, such as a specific hardware thread. The transaction may comprise a set of instructions. In some exemplary embodiments, the transaction may comprise instructions such as a read instruction, a write instruction, a commit instruction or the like.

In some exemplary embodiments, a write instruction defines setting a memory location, such as an address, within a memory, such as memory 207, with a value.

In some exemplary embodiments, a read instruction defines reading a value from a memory location of the memory, such as the memory 207. The read instruction may be annotated or otherwise provide for information regarding alternative values and transactions associated with setting each of the alternative values. In some cases, a value may be set by more than one transaction and the annotation may provide for identification of each of the more than one transaction. For example, a transaction X1 and transaction X2 may both write to memory address 0×1000 the value 55. Therefore, a read instruction associated with reading the memory address 0×1000 may be annotated such that one alternative value is 55 and it is associated with both transactions X1 and X2. In some exemplary embodiments, the origin transaction associated with each alternative value may be provided in the test program in a different manner than annotation, such as for example using meta-data or the like.

In some exemplary embodiments, a commit operation may be operative, upon execution, to commit modifications made by the transaction executed the commit instruction. In some cases, a rollback operation may be used to revoke such modification in case the transaction is determined to fail. The commit operation may be executed at the end of a transaction. In some exemplary embodiments, the commit operation may be executed in response to executing a commit instruction. In some exemplary embodiments, the commit operation may be performed in response to successfully executing the transaction. The commit operation may be performed after execution of the transaction ends.

In some exemplary embodiments, the test program obtainer 210 may comprise a test program generator 215, such as 110 of FIG. 1. The test program generator 215 may be configured to generate the test program, such as based on a test template. The test program generator 215 may determine alternative values that can be set to a memory location, such as for example, based on write instructions generated by the test program generator 215. The test program generator 215 may further determine a one or more origin transactions associated with each alternative value, based on the transaction in which the write instruction is comprised. The test program generator 215 may annotate, or otherwise provide in the test program with the alternative values for a read instruction (based on possible values set to the memory location from which the read instruction reads) and associated transactions responsible to setting each value.

In some exemplary embodiments, the test program generator 215 may determine only alternative values which may be observed by transactions. For example, consider a transaction in which a first value is set to a memory location and afterwards a second value is set to the memory location. In some exemplary embodiments, only the second value may be considered observable by other transactions, and therefore the alternative values may include the second value but not the first value.

In some exemplary embodiments, a simulator 220, such as 120 of FIG. 1, may be configured to simulate an execution of the test program obtained by the test program obtainer 210. The simulator 220 may utilize the memory 207 as the target processor may utilize its associated memory (e.g., setting and reading values from the memory).

A read instruction operator 222 may be configured to simulate an execution of a read instruction. The read instruction operator 222 may be configured to read a value from the memory 207 according to the read instruction.

A value source determinator 230 may be configured to determine a transaction that is associated with setting the value read by the read instruction operator 222. The value source determinator 230 may be configured to determine the transaction based upon the test program. For example, based upon annotations of the test program, the value source determinator 230 may determine the transaction associated with setting the value.

A Transaction Order Graph module 240 may be configured to maintain and update a TOG. The TOG may be stored in a storage device, such as the memory 207.

The TOG may be a directed graph comprising nodes and directed edges. A node of the TOG may be associated with an operation of a transaction of the test program. An edge of the TOG may represent an order between a first transaction and a second transaction during the simulated execution. The TOG module 240 may be configured to add nodes and edges to the TOG based upon the simulated execution performed by the simulator 220.

It will be noted that in case that a transaction is operated more than once during the simulation, the TOG may comprise two nodes, each associated with a different operation of the transaction.

A cycle identification module 250 may be configured to identify a cycle in the TOG. A cycle in the TOG may be representative of a bug, as a cycle may indicate that a transaction is operated both before and after another transaction. In such a case the transaction model of the target processor does not hold the atomicity property, the serializability property or the like.

An error identification module 260 may be configured to provide an indication of an error. The indication of an error may be provided by displaying a message to a user, such as 140 of FIG. 1, by generating a log file, or the like. The error indication module 260 may be responsive to the cycle identification module 250 identifying a cycle in the TOG.

A value verification module 265 may be configured to compare a value read by a read instruction operated by the read instruction operator 222 with the alternative values associated with the read instruction. The value verification module 265 may be configured to determine whether or not the value that was read is one of the alternative values. In case the value is not in accordance with the alternative values, it may be determined to be an outcome of a bug, and the error identification module 260 may be configured to provide an error indication of the bug. The alternative values may be determined based upon the test program, such as based on meta-data associated with the test program, with annotations or comments in the test program, or the like.

A commit instruction operator 270 may be configured to simulate an execution of a commit instruction. The commit instruction operator 270 may be configured to commit modifications made by a operated instruction to the memory 207 in response to the simulator 220 ending the operated instruction successfully. In some exemplary embodiments, the commit instruction operator 270 may be configured to determine a last transaction that was committed prior to ending the operated transaction. The commit instruction operator 270 may be configured to initiate an addition of an edge to the TOG maintained by the TOG module 240. The edge may be directed between the last transaction and the operated transaction, as an order between them during the simulation may be determined.

A final value identifier 275 may be configured to determine a value of a memory location at the end of the simulation performed by the simulator 220. In some exemplary embodiments, the memory location may be associated, for example, with a variable in of the test program, with a register of the target processor, with an address utilized in the test program or the like. The final value may be compared with alternative values. In case an alternative value that is different than the final value, is associated with a transaction that is performed during the simulated execution, an order of transactions may be determined A final transaction associated with setting the final value (e.g., according to the test plan), may be determined to be operated after the transaction, and an edge may be added by the TOG module 240 accordingly.

An alternative sources identifier 280 may be configured to determine an alternative transaction associated with setting an alternative value than the value read by the read instruction operator 222. In case the alternative transaction is known to have operated prior to the operation of the transaction performing the read instruction, than the alternative transaction can be determined to be operated in the simulated execution prior to the transaction determined by the value source determinator 230. In some exemplary embodiments, if during a first transaction, a value is determined to be set by a second transaction, and the value has a potential of being set by a third transaction, then in case the third transaction is known to be performed before the first transaction, than it can be determined that the third transaction is performed in the simulated execution before the second transaction. The TOG module 240 may be invoked to add an appropriate edge.

The memory 207 may be a Random Access Memory (RAM), a hard disk, a Flash drive, a storage device, or the like. The memory 207 may be partitioned into sections, such as a first section representing a memory of the target processor, and a second section maintaining data associated with the checking tool 200 itself. The memory 207 may retain the TOG, information regarding committed transactions, the test program, program code associated with modules of the checking tool 200, or the like.

In some exemplary embodiments of the disclosed subject matter, the checking tool 200 may comprise an Input/Output (I/O) module 205. The I/O module 205 may be utilized to provide an output to and receive input from a user, such as 140 of FIG. 1. The I/O module 205 may be used by the test program obtainer 210 to obtain the test program from an external source. The I/O module 205 may be used by the test program generator 215 to receive a test template and/or configuration associated with generating the test program and to retain the generated test program. The I/O module 205 may be used by the error identification module 260 to provide an error indication to the user.

In some exemplary embodiments, the checking tool 200 may comprise a processor 202. The processor 202 may be a Central Processing Unit (CPU), a microprocessor, an electronic circuit, an Integrated Circuit (IC) or the like. The processor 202 may be utilized to perform computations required by the checking tool 200 or any of it subcomponents.

In some exemplary embodiments, the disclosed subject matter may be utilized in an off-line manner A checking tool similar to the checking tool 200 of FIG. 2 may comprise a trace obtainer configured to obtain a trace of an execution of the test program. The trace obtainer may be configured to receive the trace from a simulator, from a processor executing the test program or the like. A trace analyzer may be configured to analyze the trace. The trace analyzer may comprise modules such as: a value source determinator (e.g., 230 of FIG. 2), a TOG module (e.g., 240 of FIG. 2), a cycle identification module (e.g., 250 of FIG. 2), an error identification module (e.g., 260 of FIG. 2), a value verification module (e.g., 265 of FIG. 2), a final value identifier (e.g., 275 of FIG. 2), an alternative sources identifier (e.g., 280 of FIG. 2) or the like. The trace analyzer may comprise components operative to identify a predetermined type of instruction, such as a read instruction analyzer (corresponding to 220 of FIG. 2), a commit instruction analyzer (corresponding to 270 of FIG. 2) or the like. The trace analyzer may be operative to modify the TOG of the TOG module based on analysis of the trace and identification of operation of predetermined instructions.

In some exemplary embodiments, a trace analyzer may analyze operations performed during the execution in a different order than that in which the operations are performed in the execution. For example, the trace may be analyzed starting from the end instead of from the beginning.

In some exemplary embodiments, the trace analyzer may be comprised by a different computerized device than the simulator performing the simulated execution. A technical effect of such exemplary embodiments may be that resources associated with the simulator are not allocated for analyzing the trace and updating the TOG. Note that in some cases operation of the simulator may be part of a bottleneck of a verification process.

Figure 3:
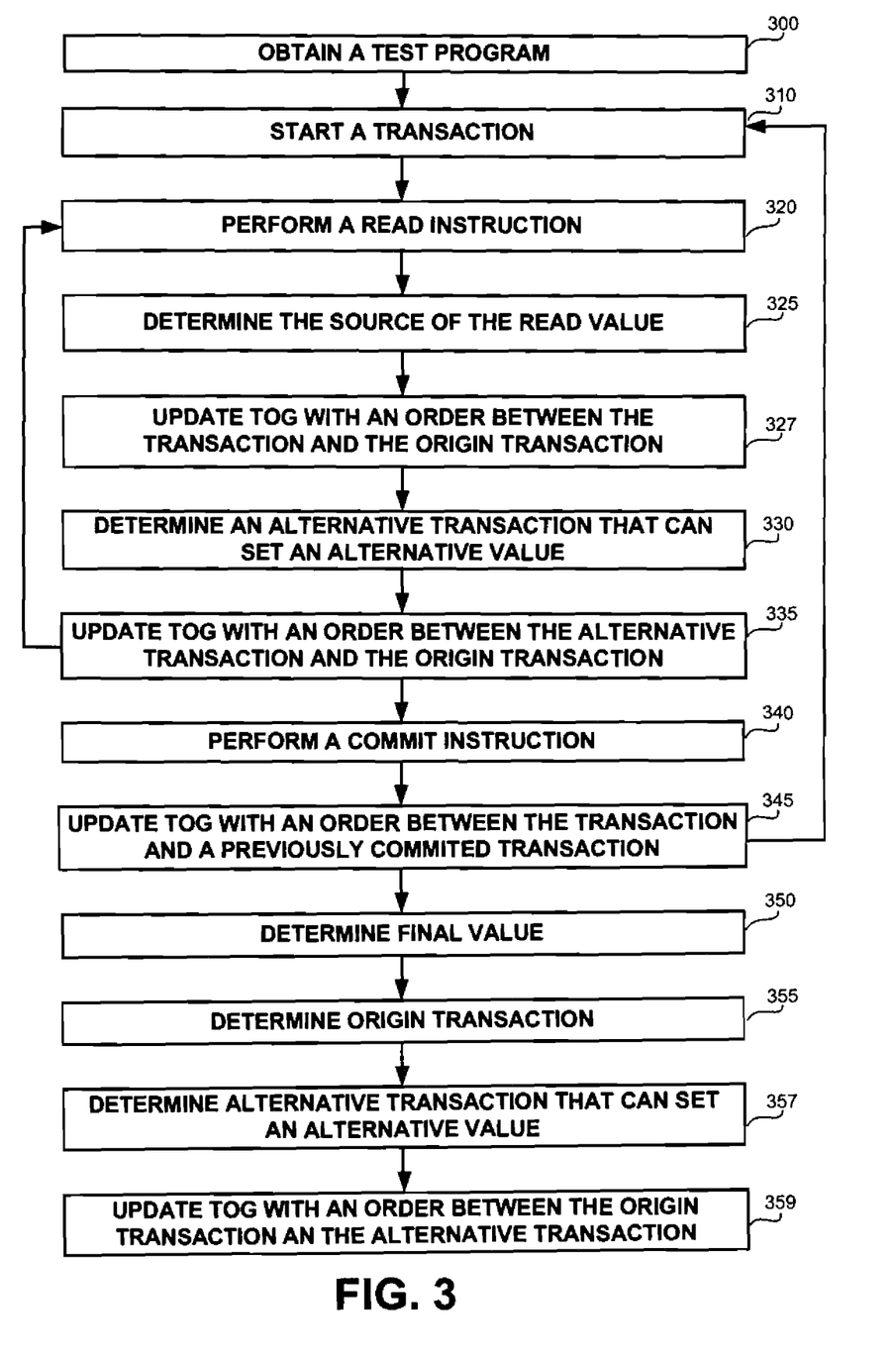
FIG. 3 shows a flowchart diagram of a method, in accordance with some exemplary embodiments of the disclosed subject matter.

Referring now to FIG. 3 showing a flowchart diagram of a method in accordance with some exemplary embodiments of the disclosed subject matter.

In step 300, a test program may be obtained. The test program may be obtained by a test program obtainer, such as 210 of FIG. 2. The following steps may be performed based on the transactions and instructions defined in the test program.

An execution may be simulated by a simulator, such as 220 of FIG. 2, during steps 310-359.

In some exemplary embodiments, the test program obtained in step 300 is simulated as being executed by a target processor having a plurality of processing entities. In such a case, steps 310-345 may be performed in respect to each processing entity that performs a transaction in accordance with the test program.

In step 310, an operation of the target processor based on a transaction defined by the test program may be simulated.

In step 320, an operation of a read instruction may be simulated. The read instruction may be performed by a read instruction operator, such as 2220 of FIG. 2. The operation may include reading a value out of a memory, such as 207 of FIG. 2.

In step 325, an origin transaction associated with setting the value read in step 320 may be identified. The origin transaction may be determined by a value source determinator, such as 230 of FIG. 2. The origin transaction may be determined based upon annotation or meta-data of the test program. In some exemplary embodiments, the origin transaction is identified only in case it is the only transaction capable of setting the value. In case two or more transactions are identified, step 327 may be omitted.

In step 327, a TOG representing an order of transaction during the simulation performed in steps 310-359 may be updated. The TOG may be updated to indicate that the origin transaction determined in step 325 is ordered before the transaction started in step 310. The TOG may be updated by a TOG module, such as 240 of FIG. 2.

In step 330, an alternative transaction operable to set an alternative value to the memory location from which the read instruction of step 320 reads is determined The alternative value is a different value than the value read in step 320. The alternative transaction is a transaction that is ordered before the transaction started in step 310.

In step 335, the TOG may be updated to represent an order between the alternative transaction (determined in step 330) and the origin transaction (determined in step 325). The origin transaction may be determined to be ordered after the alternative transaction.

In case the transaction ends, step 340 may be performed. Otherwise, step 320 may be performed in respect to another read instruction of the transaction.

It will be noted that other instructions, such as write instructions, may also be performed during the simulation of the test program and specifically during the simulation of the operation of the processor performing the transaction.

In step 340, a commit instruction may be performed. The commit instruction may be performed by a commit instruction operator, such as 270 of FIG. 2.

In step 345, the TOG may be updated to represent that the transaction for which the commit instruction was performed (e.g., the transaction started in step 310) is ordered after another transaction that committed prior to the commit instruction of step 340. The TOG may be updated by a TOG module, such as 240 of FIG. 2.

In case there is an additional transaction to be simulated according to the test program, step 310 may be performed in respect to the additional transaction. Otherwise, step 350 may be performed.

In step 350, a final value set by the simulated execution in a memory location may be determined The final value may be determined by a final value identifier, such as 275 of FIG. 2.

In step 355, an origin transaction associated with setting the final value may be determined The origin transaction may be determined by a simulator, such as 220 of FIG. 2, a value source determinator, such as 230 of FIG. 2, or the like.

In step 357, an alternative transaction that can set an alternative value in the memory location instead of the final value may be determined The alternative transaction may be determined by an alternative sources identifier, such as 280 of FIG. 2. The alternative transaction is a transaction that is executed during the simulated execution.

In step 359, the TOG may be updated to represent that the alternative transaction of step 357 is ordered before the origin transaction of step 355. The TOG may be updated by a TOG module, such as 240 of FIG. 2.

In some exemplary embodiments, an order between transactions may be determined based on rules in addition to those disclosed above. For example, the TOG may be updated to represent that a first transaction is executed before a second transaction according to the order that the first and second transactions appear in a portion of the test program that is associated with a single processing entity (e.g. a hardware thread). A person of skill in the art would recognize additional possible rules.

A cycle in the TOG may be searched for and identified in response to any modification made to the TOG, such as in steps 327, 335, 345 and 359. The cycle may be identified using a cycle identification module, such as 250 of FIG. 2. In response to identification of a cycle, an error indication may be provided.

Figure 4:
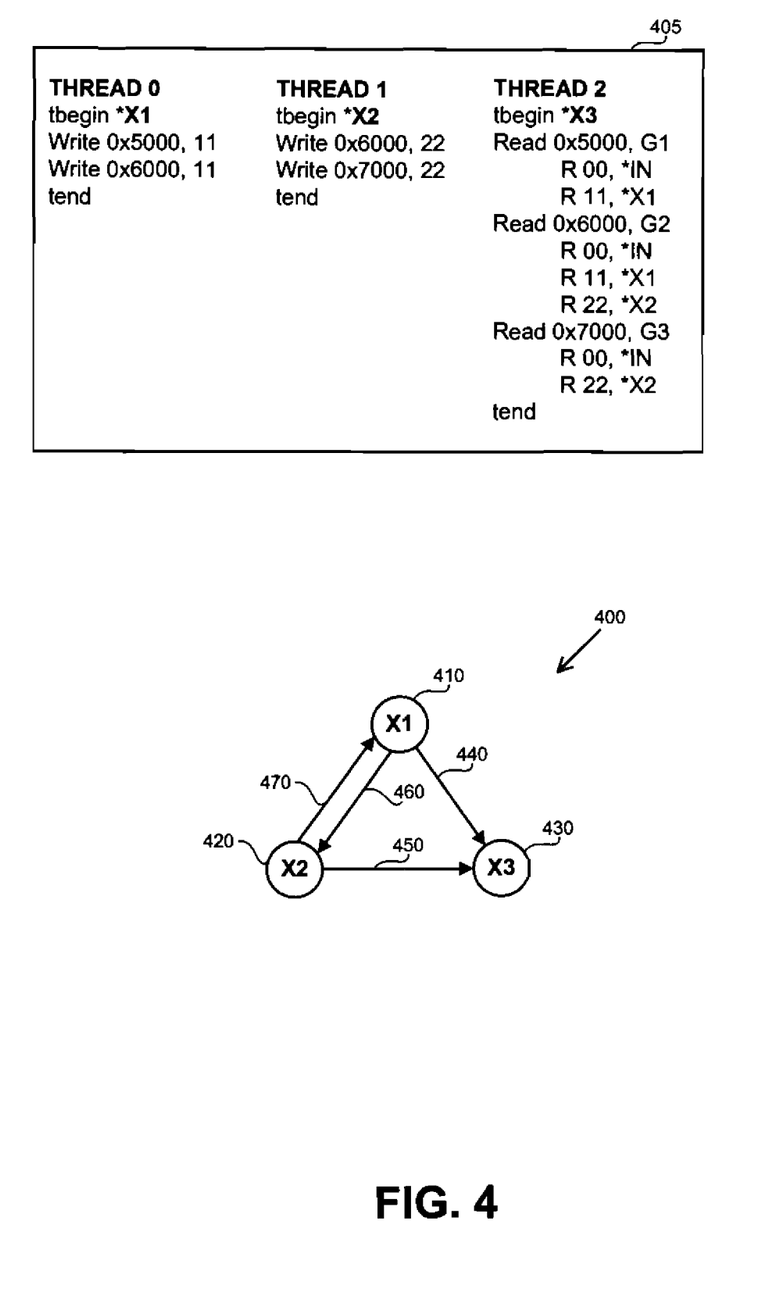
FIGS. 4 and 5 show a transaction order graph based on a simulated execution of test program, in accordance with some exemplary embodiments of the disclosed subject matter.

Referring now to FIG. 4 showing a transaction order graph based on a simulated execution of test program, in accordance with some exemplary embodiments of the disclosed subject matter.

A test program 405 comprises of instructions to three hardware threads of a target processor. Thread 0 is configured to perform transaction X1, thread 1 is configured to perform transaction X2 and thread 2 is configured to perform transaction X3. Transaction X3 comprises of three read instructions, the first from memory location 0x5000, the second from 0×6000, and the third from 0×7000. The read instructions of the test program 405 are annotated with alternative values and their respective sources. The first read instruction is annotated to read either 00, which is an initialized value (also referred to as set by an initialization transaction), or 11, which is set by transaction X1.

During a simulation of the execution of the test program 405, a TOG 400 may be updated.

Based on a first observation during execution of transaction X3 that the G1 value is determined to be 11, it can be determined that transaction X1 is the origin transaction and therefore that X1 is executed before X3. An edge 440 between an X1 node 410 and an X3 node 430 may be added to the TOG 400. The above mentioned may be performed by steps such as 320-327 of FIG. 3.

Based on a second observation during execution of transaction X3 that G2 is set with 22, it can be determined that the transaction X2 is the origin transaction and therefore that X2 is executed before X3. An edge 450 between an X2 node 420 and the X3 node 430 may be added to the TOG 400. The above mentioned may be performed by steps such as 320-327 of FIG. 3.

In some exemplary embodiments, based on the second observation, edge 460 may be added. According to the test program 405, an alternative value that can be read by the read instruction of G2 is the value 11 which is set by the transaction X1. Because the transaction X1 is performed prior to the execution of the transaction X3 (as is represented by the edge 440), and because the G2 value is set by the transaction X2 and not by the transaction X1, it can be determined that the transaction X2 is executed after the transaction X1. The TOG 400 may be updated by adding the edge 460 between the nodes 410 and 420. The above mentioned may be performed by steps such as 330-335 of FIG. 3.

Based on a third observation at the end of the simulated execution of the test program 405 that the final value set in 0×6000 is 11, it can be determined that the final value was set by the transaction X1, and not by the transaction X2 which would have set 22 to that memory location. As both transactions were executed during the simulated execution, it can be determined that the transaction X1 is performed after the transaction X2. An edge 470 may be added to the TOG 400. The above mentioned may be performed by steps such as 350-359.

A cycle between the nodes 410 and 420 may be determined, such as for example by a cycle identification module 250 of FIG. 2. The cycle is indicative of a bug as an order between the transactions X1 and X2 is not well defined.

Figure 5:
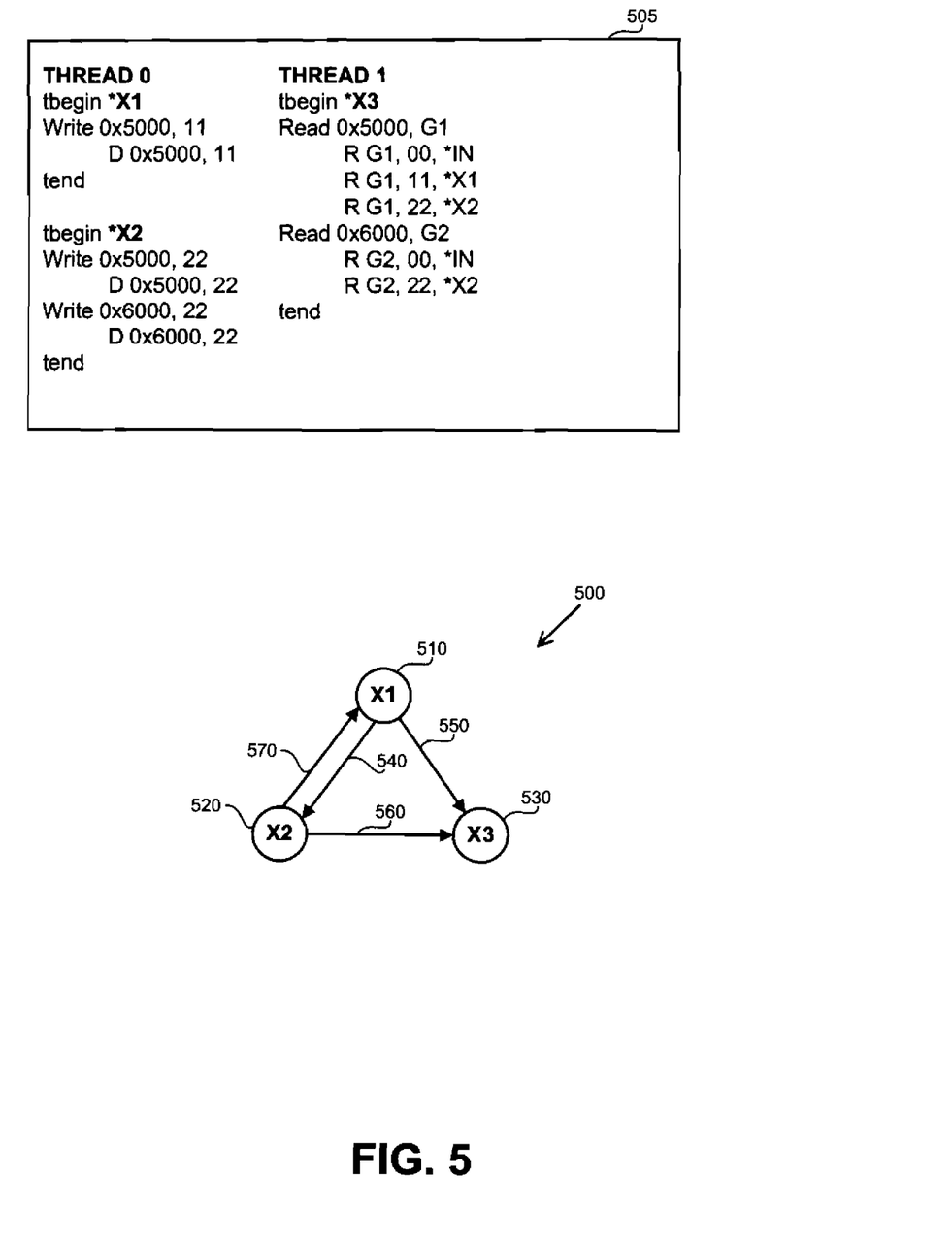

Referring now to FIG. 5 showing a transaction order graph based on a simulated execution of test program, in accordance with some exemplary embodiments of the disclosed subject matter.

A test program 505 defines actions for two processing entities: thread 0 and thread 1. Thread 0 is configured to perform transaction X1 and then transaction X2 sequentially.

Based on the test program 505, X1 may be determined to ordered before X2. An edge 540 between node X1 510 and node X2 520 may be added to a TOG 500.

During a simulation of the execution of the test program 505, the TOG 500 may be further updated.

Based on a first observation during execution of transaction X3 that the G1 value is determined to be 11, it can be determined that transaction X1 is the origin transaction and therefore that X1 is executed before X3. An edge 550 between an X1 node 510 and an X3 node 530 may be added to the TOG 500. The above mentioned may be performed by steps such as 320-327 of FIG. 3.

Based on a second observation during execution of transaction X3 that G2 is set with 22, it can be determined that the transaction X2 is the origin transaction and therefore that X2 is executed before X3. An edge 560 between an X2 node 520 and the X3 node 530 may be added to the TOG 500. The above mentioned may be performed by steps such as 320-327 of FIG. 3.

Based on the first observation an edge 570 may be also added. As G1 could have been set to 22 by the transaction X2, and as based on the second observation, it can be determined that the transaction X2 is performed before the transaction X3, it can further be determined that X1 is executed after X2 (otherwise, the value set to G1 would have is been set by X2 and not by X1).

A cycle between the nodes 510 and 520 may be determined, such as for example by a cycle identification module 250 of FIG. 2. The cycle is indicative of a bug as an order between the transactions X1 and X2 is not well defined.

It will be noted that the test program 405 and 505 provide for information as for an origin of each alternative value in an annotation of the program code. Each read instruction is annotated with alternative values and for each alternative value one or more origin transactions. The test program 505 further comprises annotations for write instructions. In some exemplary embodiments, the test program may provide the same information in a different manner. For example, the test program may comprise meta-data listing memory locations and respective alternative values and origins. Annotation may be duplicative. For example, two or more read instructions may read from the same memory location may be annotated with the same annotation.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for checking a processor, the method comprising:
    obtaining a test program of the processor, the test program comprising a plurality of transactions, the plurality of transactions comprising instructions for the processor, wherein at least one transaction of the plurality of transactions is a multiple memory accesses transaction configured, when executed, to perform multiple memory accesses using two or more instructions, wherein at least one of the instructions of the transactions is a read instruction, the read instruction associated with alternative values to be read by the read instruction, and with identifications of transactions of the plurality of transactions that are operable to set each of the alternative values to be read by the read instruction;
    simulating an execution by the processor of the test program, wherein said simulating is performed by a computer having a storage device;
    determining a value read by the read instruction during said simulating;
    updating a transaction order graph retained in the storage device, wherein each node of the transaction order graph is associated with operating one of the plurality of transactions, and wherein at least one of the transaction order graph is associated with operating the multiple memory accesses transaction, said updating based upon at least:
    a first transaction executing the read instruction; and
    a second transaction associated in the test program with setting the value read by the read instruction; and
    in response to identification of a cycle in the transaction order graph, providing an error indication.

2. The computer-implemented method of claim 1, further comprising:
    comparing the value with the alternative values; and
    in response to determining that the value is not listed in the alternative values, providing an error indication.

3. the computer-implemented method of claim 1, wherein the transaction order graph is a directed graph comprising edges representing an order of execution between two transactions in said simulating.

4. the computer-implemented method of claim 3, wherein said updating comprises adding an edge between a first node associated with the first transaction and a second node associated with the second transaction.

5. The computer-implemented method of claim 3, wherein the processor is a concurrent processor comprising a plurality of processing entities, the method further comprising adding, in the transaction order graph, an edge between a first node associated with the first transaction and a second node associated with a third transaction, wherein the third transaction is performed by a same processing entity as the first transaction, and wherein in said simulating, the third transaction is simulated to be executed prior to a simulated execution of the first transaction.

6. the computer-implemented method of claim 3, wherein response to said simulating a second commit instruction by a third transaction after a first commit instruction by a fourth transaction, adding, in the transaction order graph, an edge between a first node associated with the third transaction and a second node associated with the fourth transaction, wherein a commit instruction is operable to end a transaction of the plurality of transactions and commit modifications to the storage device performed by a transaction.

7. The computer-implemented method of claim 1,
    wherein, according to the test program, a second instruction is operable to set a first alternative value to be read by the read instruction, wherein the first alternative value is different than the value; and
    the method further comprising: in response to the transaction order graph representing that a third transaction is executed in said simulating before the first transaction and in response to the transaction order graph representing that the second transaction is executed in said simulating before the first transaction, updating the transaction order graph to further represent that the third transaction is executed in said simulating before the second transaction.

8. The computer-implemented method of claim 1, further comprising in response to said simulating completing the execution:

determining a final value of a memory location of the storage device set by said execution, when according to the test program, a fourth transaction is associated with setting the final value to the memory location;

determining that a third transaction is executed during said simulating, wherein, according toe the test program, the third transaction is associated with setting an alternative value to the memory location; and updating the transaction order graph to indicate that the third transaction is executed before the fourth transaction.

9. The computer-implemented method of claim 1, wherein the second transaction is the only transaction associated with setting the value read by the read instruction.

10. The computer-implemented method of claim 1, wherein said obtaining comprises generating the test program, said generating comprising:

determining a write instruction by a third transaction of the plurality of transactions operable to set a first alternative value to a memory location;

determining the read instruction is operable to read the first alternative value from the memory location; and adding an indication to the test program that the read instruction is operable to read the first alternative value set by the third transaction.

11. The computer-implemented method of claim 10, wherein said generating further comprises:

determining a second write instruction by a fourth transaction of the plurality of transactions operable to set the first alternative value to the memory location, wherein the indication indicates that the read instruction is operable to read the first alternative value set by either the third transaction or the fourth transaction.

12. The computer-implemented method of claim 10, wherein said generating further comprises:

determining a second write instruction by a fourth transaction operable to set a second alternative value to the memory location: and adding a second indication to the test program that the read instruction is operable to read the second alternative value set b the fourth transaction.

13. The computer-implemented method of claim 1, wherein the test program is operable to initialize a memory location using an initialization transaction in response to beginning said simulating.

14. The computer-implemented method of claim 1, further comprising generating a trace of the execution of said simulating, wherein said determining utilizes the trace.

15. A computerized apparatus for checking a processor, the computerized apparatus having a second processor and a storage device, the computerized apparatus comprising:

a test program obtainer configured to obtain a test program of the processor, the test program comprising a plurality of transactions, the plurality of transactions comprising instructions for the processor, wherein at least one of the plurality of transactions is a multiple memory accesses transaction comprising multiple memory accesses, and wherein at least one of the instructions is a read instruction, the read instruction associated with alternative values to be read by the read instruction, and with identifications of transactions of the plurality of transaction that are operable to set each of the alternative values to be read by the read instruction; and a simulator configured to simulate an execution by the processor of the test program, wherein said simulator is operable to modify values of memory locations in the storage device, said simulator comprising:

a read instruction operator configured to perform a read instruction of a first transaction of the test program;

a value source determinator configured to determine a second transaction associated in the test program with setting a value read by said read instruction operator;

a transaction order graph module configured to update a transaction order graph retained in said storage device, wherein each node of the transaction order graph is associated with operating a transaction, wherein at least one node of the transaction order graph is associated with operating the multiple memory accesses transaction, and wherein said simulator is operative to utilize said transaction order graph module to add a representation that the second transaction is executed during the execution before the first transaction is executed;

a cycle identification module configured to identify a cycle in the transaction order graph; and an error indication module configured to provide an error indication in response to an identification of the cycle by said cycle identification module.

16. The computerized apparatus of claim 15, said simulator further comprising a value verification module configured to compare a first value read by the read instruction performed by said read instruction operator with the alternative values according to the test program, wherein said error identification module is further configured to provide an error indication in response to said value verification module determining that the first value is not listed in the alternative values.

17. The computerized apparatus of claim 15, wherein the transaction order graph is a directed graph comprising edges representing an order of execution between two transactions in said simulating.

18. The computerized apparatus of claim 15, wherein said simulator further comprises a commit instruction operator configured to perform a commit instruction of a third transaction of the plurality of transaction, wherein said commit instruction operator is further configured to record an indication of the third transaction, wherein the commit instruction is operable to end the third transaction and commit modifications to the storage device performed by the third transaction, and wherein said simulator is operative to utilize said transaction order graph module to add, in the transaction order graph, indications of orders between transactions based on the recordation of said commit instruction operator.

19. The computerized apparatus of claim 15, said simulator further comprising a final value identifier configured to determine a final value of a memory location of the storage device set by said simulator during the execution, wherein said simulator is configured to utilize said value source determinator to determine a third transaction associated with setting the final value, and wherein said simulator is operative to utilize said transaction order graph module to add, in the transaction order, graph indications that transactions performed during the execution that are capable of setting values to the memory location different than the final are executed before the third transaction.

20. The computerized apparatus of claim 15, wherein said simulator further comprises an alternative sources identifier configured to identify a third transaction associated in the test program with setting a first alternative value to the value read by said read instruction operator, and wherein said simulator is operative to: utilize said transaction order graph module; and in response to the transaction order graph representing that the second transaction is executed before the first transaction, update the transaction order graph to further represent that the third transaction is executed before the second transaction.

21. The computerized apparatus of claim 15, wherein said test program obtainer comprises a test program generator, wherein said test program generator is configured to generate the test program.

22. The computerized apparatus of claim 15, wherein said test program obtainer is further configured for generating the test program, said generating comprising:
   determining a write by a third transaction of the plurality of transactions operable to set a first alternative value to a memory location;
   determining the read instruction is operable to read the first alternative value from the memory location; and
   adding an indication to the test program that the read instruction is operable to read the first alternative value set by the third transaction.

23. The computerized apparatus of claim 22, wherein test program obtainer is further configured for:
   determining a second write instruction by a fourth transaction operable to set a second alternative value to the memory location; and
   adding a second indication to the test program that the read instruction is operable to read the second alternative value set by the fourth transaction.

24. A computerized apparatus for checking a processor, the computerized apparatus having a second processor and a storage device, the computerized apparatus comprising:
   a trace obtainer configured to obtain a trace of an execution of a test program of the processor, the test program comprising a plurality of transactions, the plurality of transactions comprising instructions for the processor, wherein at least one of the instructions is a read instruction, the read instruction associated with alternative values to be read by the read instruction, and with identifications of transactions of the plurality of transactions that are operable to set each of the alternative values to be read by the read instruction;
   a trace analyzer configured to analyze the trace, said trace analyzer comprising:
   a read instruction analyzer configured to identify performing a read instruction of a first transaction of the test program based on the trace;
   a value source determinator configured to determine a second transaction associated in the test program with setting a value read by the read instruction;
   a transaction order graph module configured to update a transaction order graph retained in said storage device, wherein each node of the transaction order graph is associated with operating a transaction, wherein at least one node is associated with operating a multiple memory accesses transaction of at least one of the plurality of transactions, the multiple memory accesses transaction comprising multiple memory accesses, and wherein said trace analyzer is operative to utilize said transaction order graph module to add a representation that the second transaction is executed during the execution before the first transaction is executed;
   a cycle identification module configured to identify a cycle in the transaction order graph; and
   an error indication module configured to provide an error indication in response to an identification of the cycle by said cycle identification module.

25. The computerized apparatus of claim 24, wherein said trace obtainer is configured to obtain the trace from a simulator operative to simulate an execution of the test program by the processor.

26. The computerized apparatus of claim 24, further comprising at least one of:
   a commit instructor analyzer configured to update said transaction order graph module to add in the transaction order graph indications of an order between a pair of transactions based on indications in the trace of committing the pair of transactions in the order;
   a final value identifier configured to determine a final value of a memory location set during the execution based on the trace, wherein said trace analyzer is configured to utilize said value source determinator to determine a fourth transaction associated with setting the final value, and wherein said trace analyzer is operative to utilize said transaction order graph module to add, in the transaction order graph, indications indication that transactions that are performed during the execution based on the trace and that are capable of setting values to the memory location different than the final value are executed in before the fourth transaction; and
   an alternative sources identifier configured to identify a third transaction associated in the test program with wetting a first alternative value to the value read by the read instruction, wherein said trace analyzer is operative to: utilize said transaction order graph module; and in response to the transaction order graph representing that the second transaction is executed before the first transaction, update the transaction order graph to further represent that the third transaction is executed before the second transaction.

27. A computer program product for checking a processor, the computer program product comprising:
   a non-transitory computer readable medium;
   a first program instruction for obtaining a test program of the processor, the test program comprising a plurality of transactions, the plurality of transactions comprising instructions for the processor, wherein at least one of the instructions is a read instruction, the read instruction associated with alternative values to be read by the read instruction, and with identifications of transactions of the plurality of transactions that are operable to set each of the alternative values to be read by the read instruction;
   a second program instruction for simulating an execution by the processor of the test program;
   a third program instruction for determining a value read by the read instruction during the simulation;
   a fourth program instruction for updating a transaction order graph, wherein each node of the transaction order graph is associated with operating one of the plurality of transactions, and wherein at least one node is associated with operating a multiple memory accesses transaction of the one of the plurality of transactions, the multiple memory accesses transaction comprising multiple memory accesses, said updating based upon at least:
   a first transaction executing the read instruction; and
   a second transaction associated in the test program with setting the value read by the read instruction; and
   a fifth program instruction for providing an error indication in response to identifications of a cycle in the transaction order graph, wherein said first, second, third, fourth, and fifth program instructions are stored on said non-transitory computer readable medium.

* * * * *